(12) United States Patent
Nibarger et al.

(10) Patent No.: US 8,089,726 B2
(45) Date of Patent: Jan. 3, 2012

(54) METHOD FOR COUNTERACTING LONGITUDINAL OSCILLATIONS OF MAGNETIC TAPE IN A TAPE DRIVE SYSTEM

(75) Inventors: John P. Nibarger, Superior, CO (US); Anand V. Lakshmikumaran, Westminster, CO (US)

(73) Assignee: Oracle America, Inc., Redwood City, CA (US)

( * ) Notice: Subject to any disclaimer, the term of this patent is extended or adjusted under 35 U.S.C. 154(b) by 953 days.

(21) Appl. No.: 12/054,920

(22) Filed: Mar. 25, 2008

(65) Prior Publication Data

US 2009/0244773 A1 Oct. 1, 2009

(51) Int. Cl.
*G11B 15/60* (2006.01)
(52) U.S. Cl. ............ 360/130.21; 360/128; 242/326.4
(58) Field of Classification Search .......... 360/128, 360/130.2–130.33; 242/326.4, 340, 346.2
See application file for complete search history.

(56) References Cited

U.S. PATENT DOCUMENTS 5,730,349 A * 3/1998 Okazaki et al. ............... 226/178
5,769,357 A * 6/1998 Kwon ....................... 242/615.2

FOREIGN PATENT DOCUMENTS

| JP | 54046016 A | * | 4/1979 |
|---|---|---|---|
| JP | 54151418 A | * | 11/1979 |
| JP | 63078305 A | * | 4/1988 |
| JP | 05128661 A | * | 5/1993 |
| JP | 06076427 A | * | 3/1994 |
| JP | 07220331 A | * | 8/1995 |
| JP | 07262657 A | * | 10/1995 |
| JP | 07320246 A | * | 12/1995 |
| JP | 08007522 A | * | 1/1996 |
| JP | 08273254 A | * | 10/1996 |
| JP | 09147458 A | * | 6/1997 |
| JP | 10143951 A | * | 5/1998 |
| JP | 10162456 A | * | 6/1998 |
| JP | 10320730 A | * | 12/1998 |
| JP | 2001093212 A | * | 4/2001 |
| JP | 2002025156 A | * | 1/2002 |
| JP | 2004335047 A | * | 11/2004 |
| SU | 733003 B | * | 5/1980 |
| SU | 775752 B | * | 10/1980 |
| SU | 888195 B | * | 12/1981 |
| SU | 933573 B | * | 6/1982 |

OTHER PUBLICATIONS

English-machine translation of JP 07-262657 A, to Tabuchi, published on Oct. 13, 1995.*
English-machine translation of JP 09-147458 A, to Nakajima, published on Jun. 6, 1997.*

* cited by examiner

*Primary Examiner* — Will J Klimowicz
(74) *Attorney, Agent, or Firm* — Brooks Kushman P.C.

(57) ABSTRACT

A method for counteracting longitudinal oscillations in a magnetic tape as it passes over a head in a tape drive system includes the steps of passing the magnetic tape over the head, detecting the occurrence of longitudinal oscillations in the magnetic tape, and generating counteractive longitudinal oscillations in the magnetic tape that are substantially 180° out of phase with the longitudinal oscillations to substantially cancel the longitudinal oscillations.

19 Claims, 5 Drawing Sheets

METHOD FOR COUNTERACTING LONGITUDINAL OSCILLATIONS OF MAGNETIC TAPE IN A TAPE DRIVE SYSTEM

BACKGROUND OF THE INVENTION

1. Field of the Invention

The invention disclosed herein relates to a method for counteracting the longitudinal oscillations of a magnetic tape as it passes through a tape drive system.

2. Background Art

Conventional tape drive systems for use with magnetic tape include a rotating hub for driving the magnetic tape through the tape drive system, a plurality of rotating rollers for guiding the magnetic tape as it passes through the tape drive system and one or more tape heads or heads which selectively read magnetic information from, and write magnetic information to, the magnetic tape as it passes through the tape drive system. The efficiency of the head is dependent, among other factors, upon its proximity to the magnetic tape as the magnetic tape moves past the head. The smoother the magnetic tape is, the closer its surface is to the tape head and the greater the efficiency of the tape head. Accordingly, it is desirable to use magnetic tape that is as smooth as possible and keep it in contact with the devices on the head surface.

However, as the smoothness of magnetic tape increases, the percentage of its surface that comes in direct contact with the head increases, resulting in an increase in frictional forces acting on the magnetic tape. This increased frictional force imparts vibrations to the magnetic tape in the longitudinal direction. As used herein, any reference to longitude or longitudinal direction is a reference to the direction of intended tape travel through the tape drive system. Oscillation of the magnetic tape in a longitudinal direction as it passes over the head can result in timing variations that can cause misregistration of the data recorded on the magnetic tape which can cause errors when the magnetic data is read or otherwise utilized by the tape drive system. The present invention addresses this and other problems.

SUMMARY OF THE INVENTION

A method of counteracting longitudinal oscillations in a magnetic tape as it passes over a head in a tape drive system is disclosed herein. In a first embodiment, the method includes the steps of passing the magnetic tape over the head, detecting the occurrence of longitudinal oscillations in the magnetic tape, and generating counteractive longitudinal oscillations in the magnetic tape that are substantially 180° out of phase with the longitudinal oscillations to substantially cancel the longitudinal oscillations.

In one implementation of the first embodiment, the tape drive system includes a hub for pulling the magnetic tape through the tape drive system. The counteractive longitudinal oscillations are generated by changing a rotational velocity of the hub. In some variations, the tape drive system further includes a second hub for controlling rotation of the magnetic tape in a tape cartridge associated with the tape drive system and the rotational velocity of the first and the second hubs are alternately increased and diminished in a sequence that generates the counteractive longitudinal oscillation.

In another implementation of the first embodiment, the tape drive system has two or more rollers for guiding the magnetic tape through the tape drive system, the two or more rollers being disposed on opposite sides of the head and the longitudinal oscillations of the magnetic tape occur between the two rollers. In this variation, the counteractive longitudinal oscillations are first mode oscillations.

In another implementation of the first embodiment, the tape drive system includes a plurality of rollers for guiding the magnetic tape through the tape drive system. The counteractive longitudinal oscillations are generated by moving one of the rollers longitudinally. In a variation, one of the rollers is moved back and fourth longitudinally in a sequence that generates the counteractive longitudinal oscillations. In another variation, the counteractive longitudinal oscillations are generated by moving two or more of the rollers longitudinally.

In another implementation of the first embodiment, the counteractive longitudinal oscillations are generated by moving the head longitudinally. In a variation, the head may be moved back and fourth longitudinally in a sequence that generates the counteractive longitudinal oscillations. In another variation of this implementation, the tape drive system may include two or more of the heads. The counteractive longitudinal oscillations may be generated by moving the two or more heads longitudinally.

In the second embodiment, a method for counteracting longitudinal oscillations in a magnetic tape as it passes over a head in a tape drive system includes the step of passing the magnetic tape over the head, detecting the occurrence of longitudinal oscillations in the magnetic tape, generating counteractive longitudinal oscillations in the magnetic tape that are substantially 180° out of phase with the longitudinal oscillations, and then repeating the detecting step and the generating step until the longitudinal oscillations are substantially canceled out.

In one implementation of the second embodiment, the tape drive system includes a first and a second hub for pulling the magnetic tape through the tape drive system. The counteractive longitudinal oscillations are generated by changing a rotational velocity of at least one of the first and the second hubs.

In another implementation of the second embodiment, the tape drive system includes a plurality of rollers for guiding the magnetic tape through the tape drive system. The counteractive longitudinal oscillations may be generated by moving one of the rollers longitudinally. In one variation of this implementation, the one of the rollers is moved back and forth longitudinally in a sequence that generates the counteractive longitudinal oscillations.

In another implementation of the second embodiment, the counteractive longitudinal oscillations are generated by moving the head longitudinally. In a variation of this implementation, the head may be moved back and fourth longitudinally in a sequence that generates the counteractive longitudinal oscillations.

In a third embodiment of a method for counteracting longitudinal oscillations in a magnetic tape as it passes over a head in a tape drive system, the tape drive system including a plurality of rollers for guiding the magnetic tape through the tape drive system, the method includes the steps of passing the magnetic tape over the head, detecting the occurrence of longitudinal oscillations in the magnetic tape and changing a rotational damping characteristic of one of the rollers to reduce an amplitude of the longitudinal oscillations.

In an implementation of the third embodiment, the rotational damping characteristic of one of the rollers is alternately increased and diminished in a sequence that dampens the longitudinal oscillations.

In another implementation of the third embodiment, the rotational damping characteristics of a plurality of the rollers is alternately increased and diminished in a sequence that dampens the longitudinal oscillations.

In another implementation of the third embodiment, the rotational damping characteristics of all of the rollers is alternately increased and diminished in a sequence that dampens the longitudinal oscillations.

BRIEF DESCRIPTION OF THE DRAWINGS

The description herein makes reference to the accompanying drawing wherein like reference numerals refer to like parts through the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
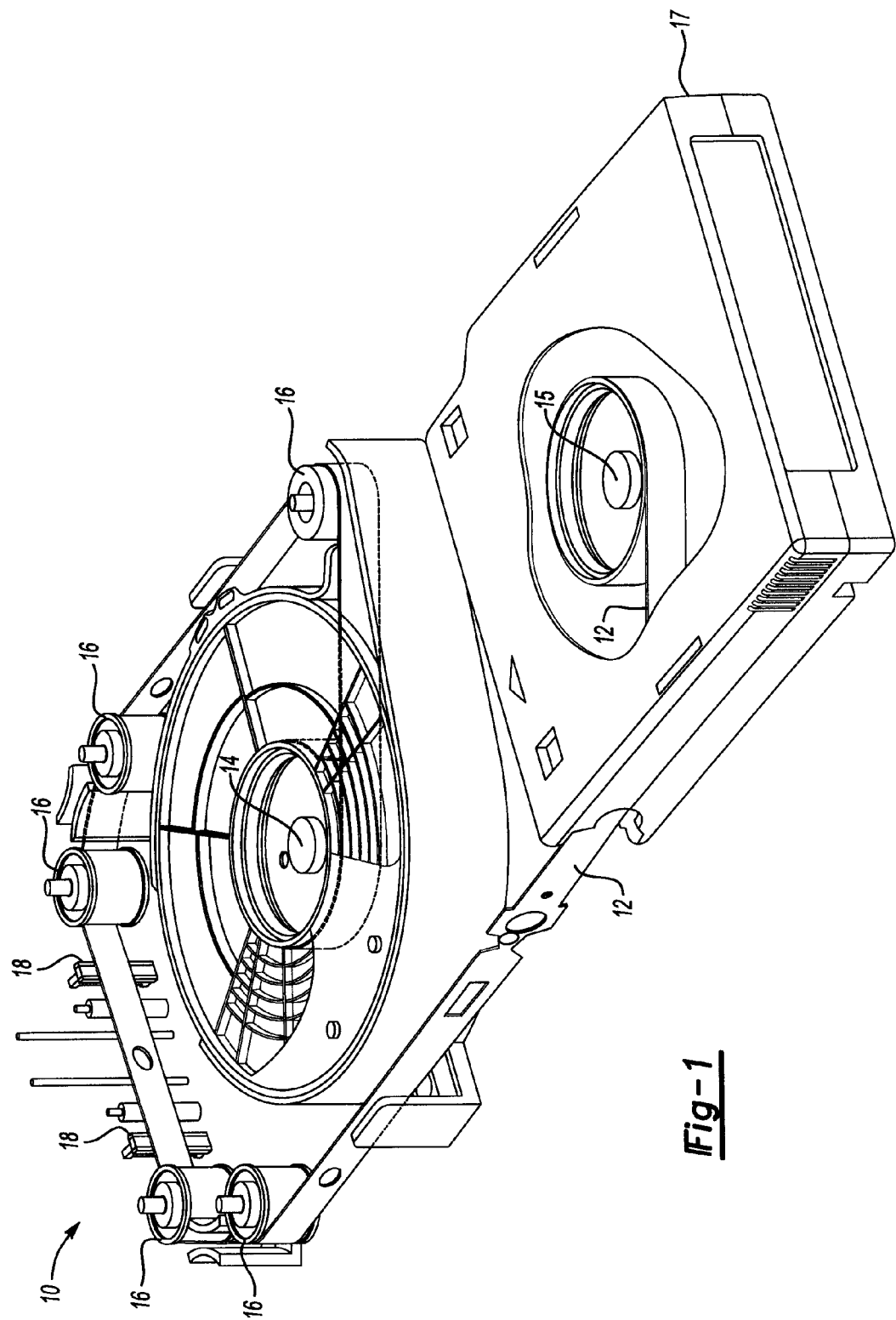
FIG. 1 is a perspective view of a tape drive system.

FIG. 1 is a perspective fragmentary view illustrating a portion of a tape drive system 10 capable of reading information from, and writing information to, a magnetic tape 12. Such tape drive systems are typically associated with computer tape backup systems. However, it should be understood that the teachings of the present invention are not limited to use with a tape backup system, but may be used with any system that utilizes a flexible medium including but not limited to, optical tape, film, paper, foil and the like. In the illustrated embodiment, magnetic tape 12 is affixed at one end to a hub 14 and is wound around a second hub 15 within a tape cartridge 17. Hub 14 and hub 15 are configured to rotate. As hub 14 rotates, magnetic tape 12 winds around hub 14 and unwinds from hub 15. Tape drive system 10 also includes a plurality of rollers 16. Rollers 16 are configured to rotate about an axis and serve to guide magnetic tape 12 as it passes through tape drive system 10.

Tape drive system 10 further includes a pair of heads 18 which are disposed adjacent the path followed by the magnetic tape and/or positioned so as to come into physical contact with magnetic tape 12 as it passes through tape drive system 10. As magnetic tape 12 passes each head 18, magnetic tape 12 rubs up against head 18 thus permitting head 18 to read magnetic data from and/or write magnetic data to magnetic tape 12.

Magnetic tape 12 is made from a material capable of receiving and storing magnetic data. This material has elasticity and is able to stretch. This ability to stretch makes the magnetic tape 12 capable of vibrating.

Figure 2:
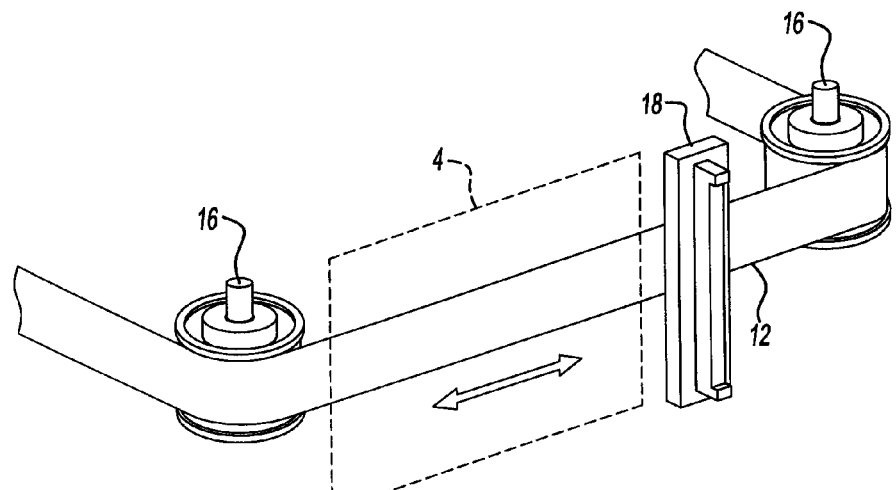
FIG. 2 is a fragmentary perspective view illustrating a portion of the tape drive system of FIG. 1.

A portion of tape drive system 10 is illustrated in FIG. 2. The portion illustrated includes two rollers 16 on opposite sides of a tape head 18. For ease of illustration, only a single head 18 is illustrated. In other embodiments, tape drive system 10 may include one or more heads 18. As magnetic tape 12 travels from the bottom roller 16 to the top roller 16, and passes over head 18, magnetic tape 12 rubs against tape head 18. As magnetic tape 12 and head 18 come into contact and move past one another, frictional forces act on magnetic tape 12 to hold it in place or to slow it down, increasing the tension on magnetic tape 12. As hub 14 continues to pull on magnetic tape 12, the tension builds until the force acting on magnetic tape 12 exceeds the frictional forces acting on magnetic tape 12, at which point magnetic tape 12 springs forward past head 18 as magnetic tape 12 contracts. In this manner, the movement of magnetic tape 12 past head 18 is impacted by a series of sticking and slipping events that excite longitudinal vibrations in the tape. The smoother magnetic tape 12 is, the greater the surface contact will be and hence the greater the frictional forces acting on magnetic tape 12 will be.

Figure 3:
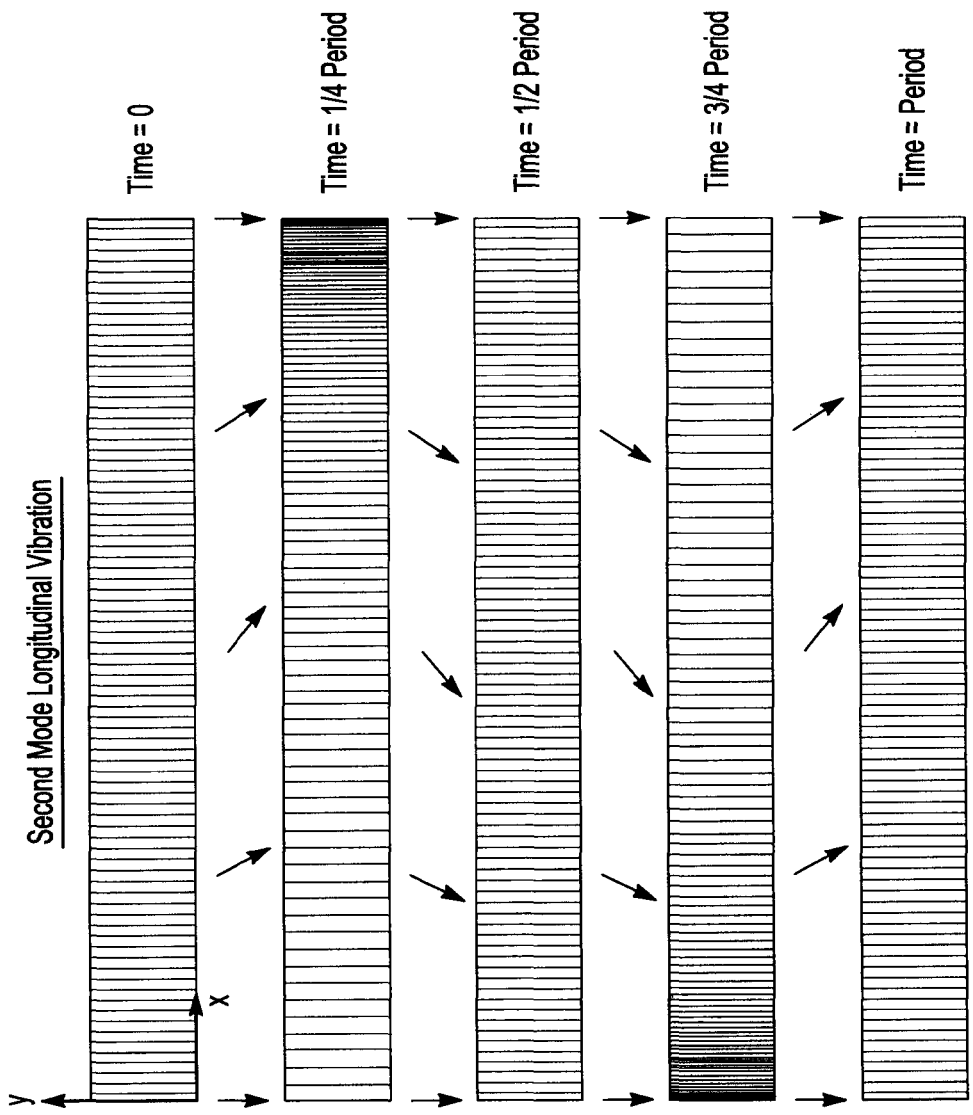
FIG. 3 is a schematic view illustrating the effects of longitudinal vibrations on magnetic tape over time.

The cycle of magnetic tape 12 alternately sticking to and then slipping past head 18 causes magnetic tape 12 to oscillate in a longitudinal direction between the two rollers 16 depicted in FIG. 2. In this regard, the two rollers 16 depicted in FIG. 2 represent the boundary conditions for an oscillating medium (magnetic tape 12). This type of longitudinal oscillation is illustrated in FIG. 3 which depicts the impact of a second mode longitudinal vibration over the course of a single period on a section of magnetic tape such as magnetic tape 12. The magnetic tape illustrated in FIG. 3 has been divided into multiple segments (this delineation is solely for the purpose of illustrating the impact of longitudinal vibration on magnetic tape). At time zero, which is prior to the excitation of any longitudinal vibrations in the magnetic tape, each of the individual segments of the magnetic tape has the same longitudinal dimension. When the time is equal to one quarter of a period, the effect of the excitation is illustrated in the form of the segments at the left hand side of the magnetic tape becoming elongated and the segments on the right hand side of the magnetic tape becoming compressed. When the time equals one half of a period, the magnetic tape begins to oscillate back toward the left hand side and each segment of the magnetic tape has substantially the same longitudinal dimension as each of the other segments. When time equals three quarters of a period, movement of the magnetic tape towards the left hand side occurs. At this point, the segments at the right hand side of the magnetic tape have become elongated in the longitudinal direction while the segments at the left hand side of the magnetic tape have become compressed. When the time is equal to a full period, the magnetic tape has returned to its original condition and each individual segment has the same longitudinal dimension that it had prior to excitation of the longitudinal vibration. This system is analogous to a string fixed at two ends and vibrating there between, except the longitudinal vibrations in magnetic tape 12 occur in the plane of the tape in the direction of the tape motion. Such a system is illustrated in FIG. 4.

Figure 4:
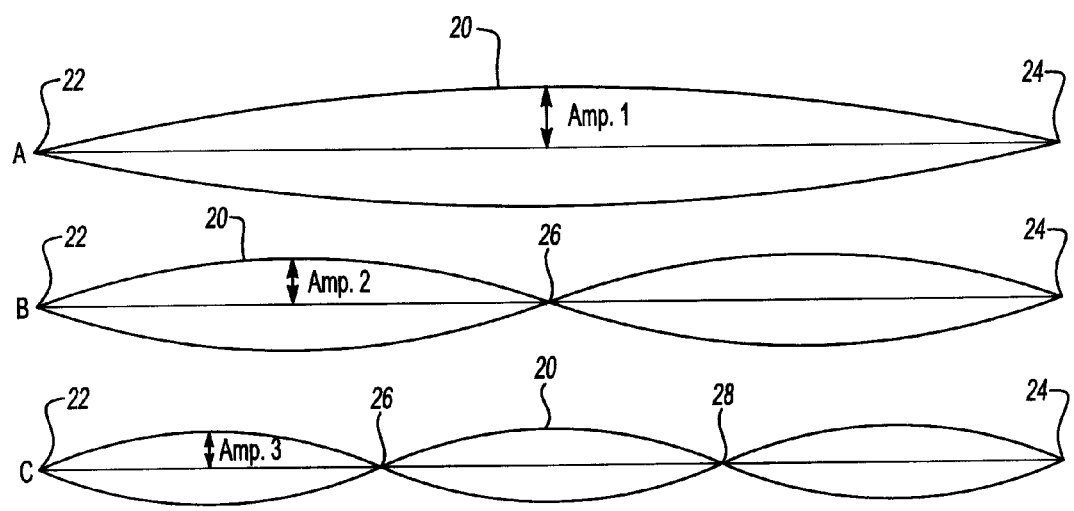
FIG. 4 is a schematic view illustrating the formation of standing waves in a system with fixed end point boundary conditions.

FIG. 4 shows a string 20 that fits between a first point 22 and a second point 24. When broadband energy is added to string 20, such as by plucking it, it begins to vibrate in an up and down direction. The fundamental or first mode vibration is illustrated in FIG. 4 at standing wave A. In a first mode vibration, the string moves in an up and down direction, with the entire string moving up at the same time and then down at the same time. In the second mode vibration, the waveform takes a different shape, with a first node 26 (a part of the string that does not move up and down) forming at the center of the string. The presence of a single node denotes a second mode vibration. In the third mode vibration, the waveform changes again with the second node 28 forming between the first point 22 and second point 24. FIG. 3 illustrates a third mode vibration at standing wave C. As broadband energy is added to the system, higher modes of vibration are excited. The resulting string vibration is a combination of the different modes of vibration. The only portions of the string not moving in an up and down direction are the two ends fastened at first point 22 and second point 24. As more energy is added to the system, the wave form takes a different shape, with a node 26 (a part of the string that does not move up and down) forming at the center of the string. The presence of a single node denotes a second mode vibration. This is illustrated in FIG. 4 at standing wave B. As still more energy is added to the string, the wave form changes again, with a second node 28 forming between the first point 22 and the second point 24. FIG. 4 illustrates a third mode vibration at standing wave C. As energy is added to the system, the number of nodes increases.

As illustrated in FIG. 4, as the number of nodes increases between the first and second points 22, 24, the amplitude of the standing wave diminishes. Accordingly, amplitude one, associated with the first mode vibration, is larger than amplitude two associated with the second mode vibration which, in turn, is larger than amplitude three associated with the third mode vibration.

Figure 5:
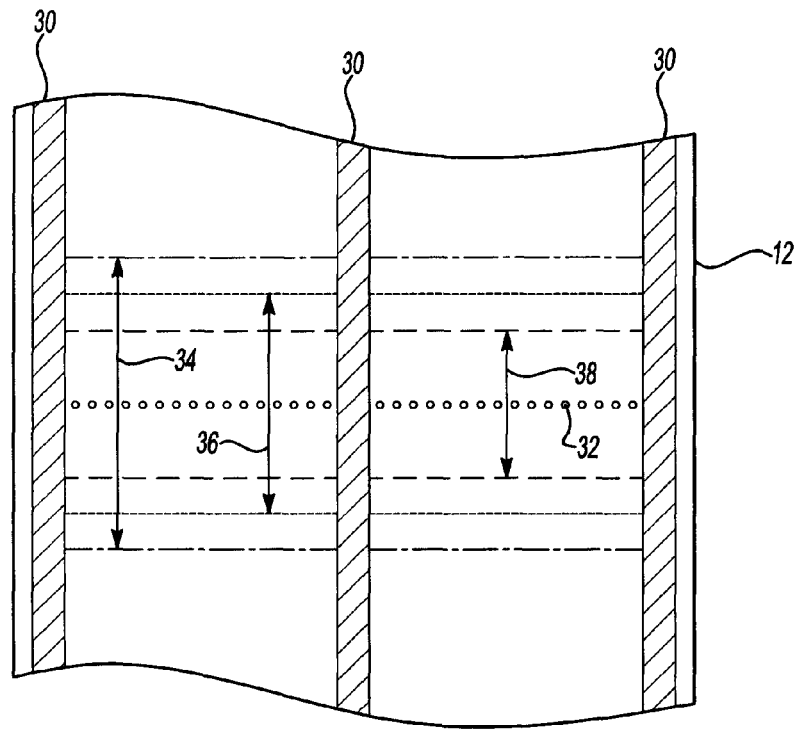
FIG. 5 is a fragmentary schematic view illustrating a portion of the magnetic tape illustrated in the tape drive system of FIG. 2.
Figure 6:
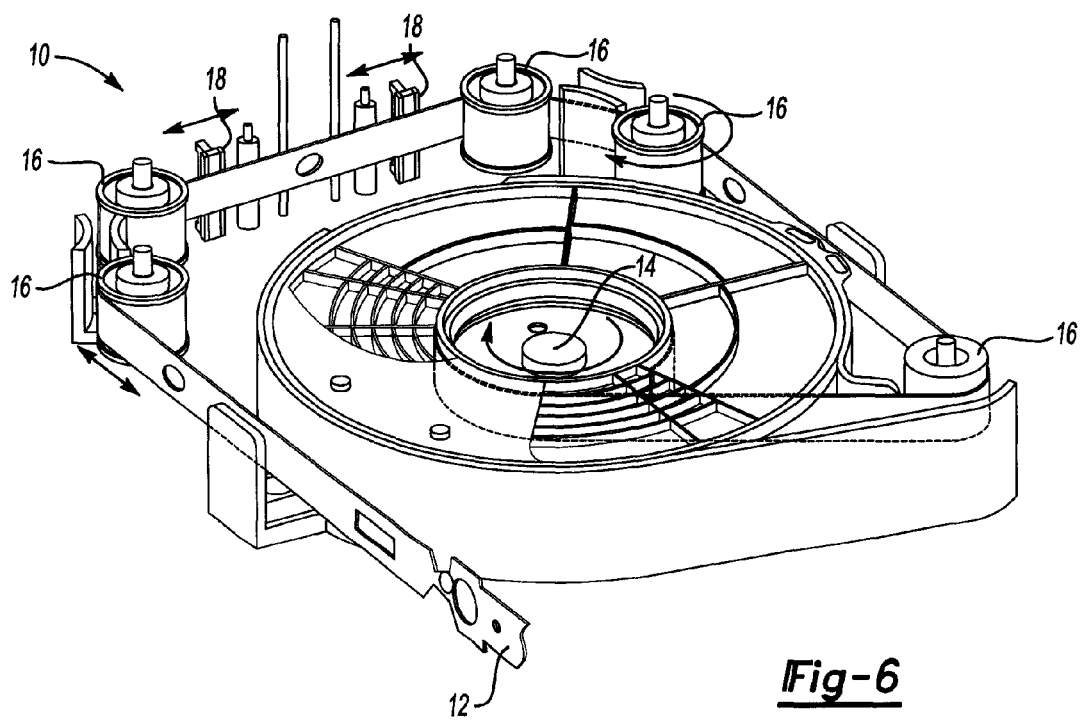
FIG. 6 is a fragmentary perspective view of the tape drive system of FIG. 1 illustrating various embodiments of the method of the present invention.

The principles illustrated in FIG. 4, when applied to longitudinal oscillations in magnetic tape 12 is illustrated in FIG. 5. FIG. 5 illustrates the boxed portion of magnetic tape 12 delineated in FIG. 2. Magnetic tape 12 includes a plurality of servo tracks 30 which contain information that head 18 uses to align itself laterally with respect to magnetic tape 12. As used herein, the term lateral and laterally refers to a direction in the plane of magnetic tape 12 that is perpendicular to the longitudinal direction and in the plane of the tape. The data is typically recorded between two consecutive servo tracks 30. Head 18 typically reads and/or writes data from/to magnetic tape 12 in a region between the consecutive servo tracks 30 as magnetic tape 12 travels in a first direction. Head 18 then moves laterally to read/write data from/to magnetic tape 12 between the next two servo tracks as magnetic tape 12 travels in the opposite direction.

Magnetic data is recorded to magnetic tape 12 by a plurality of discrete read/write elements (not shown) arranged on head 18 as magnetic tape 12 passes head 18. Accordingly, a plurality of longitudinally extending data tracks are arranged on magnetic tape 12. When reading data from magnetic tape 12, the individual read/write elements of head 18 need to be aligned laterally with the data tracks recorded to magnetic tape 12. Additionally, the data tracks should pass over a corresponding read/write element of head 18 at a substantially constant rate to allow tape drive system 10 to accurately compile and/or otherwise utilize the magnetic data.

When longitudinal oscillations are propagated through magnetic tape 12, the magnetic data disposed on magnetic tape 12 at any given longitudinal position will move back and forth longitudinally. This longitudinal back and forth movement of data can cause reading and writing errors to occur such as when the data passes past the discrete read/write elements of tape head 18 multiple times due to the back and forth motion of magnetic tape 12, or, when the magnetic data passes over head 18 earlier or later than expected due to the longitudinal oscillations. In FIG. 5, broken line 32 represents a discrete set of magnetic data recorded to magnetic tape 12. The first pair of broken lines 34 represents the distance that the data contained in broken line 32 may move longitudinally when magnetic tape 12 experiences a first mode oscillation. It should be understood that FIG. 5 is a schematic view and the distances indicated are for illustration purposes only. The actual amplitude of a first mode oscillation may be in the range of 10 nm to 100 nm. Second pair of broken lines 36 represents the longitudinal distance that the data represented by broken line 32 may move when magnetic tape 12 experiences a second mode oscillation. Third pair of broken lines 38 represents the longitudinal distance that the data represented by broken line 32 may move back and forth between as magnetic tape 12 experiences a third mode oscillation. As the number of modes increases, the longitudinal deviation of any given magnetic data bit from where it would be if magnetic tape 12 experienced no oscillations diminishes.

Tape drive system 10 includes multiple means by which the presence of longitudinal oscillations in magnetic tape 12 can be detected. This method entails the use of servo readers on the head which read special patterns (called servo patterns) on the pre-formatted tape. Based on the formatting information and the output of the servo readers, the lateral position of the head and the longitudinal position of the tape is calculated. The difference between the desired longitudinal position and the actual longitudinal position is called the timing delta. This timing delta can be used to control and minimize the longitudinal vibrations of the tape. Another method of detecting longitudinal vibrations involves a measurement by the sensor (read element) of a known frequency of data that has been written into the media. A Fourier transform of this signal is taken and the resulting frequency spectrum is analyzed. In the absence of longitudinal oscillations the primary frequency will be the frequency the data was written at. If the sensor response is perfectly linear, then this will be the only peak measured. If the sensor has a non-linear response, then additional harmonics of the main peak will be present as well. In the presence of longitudinal oscillations, a peak at the longitudinal oscillation frequency will be present. Additional harmonics of this peak will also be present in the case of a non-linear sensor response. The size of the peak corresponding to the longitudinal oscillations can be used to control and minimize the longitudinal vibrations in the tape. In the two above methods for detecting longitudinal oscillations, classical feedback control strategies will be used to minimize the timing delta or size of the peak corresponding to the longitudinal oscillations, respectively. In classical feedback control, the output of the system (longitudinal tape motion), the controller, and active controls (all embodiments and their implementations) together should follow a reference signal (timing delta equals zero or size of peak corresponding to the longitudinal oscillations) in the presence of external disturbances and excitations (stick/slip motion at the head/tape interface). Various controller designs exist for control of such classical feedback systems such as phase lock loop control, proportional-integral-derivative (PID) control, etc. and any of these could be applicable to this problem.

To avoid the errors in writing data to, and reading data from, magnetic tape 12 as it passes through tape drive system 10, the method of the present invention introduces counteractive longitudinal oscillations into magnetic tape 12 that are substantially 180° out of phase with the longitudinal oscillations caused by magnetic tape 12 passing over tape head 18 (or that are caused by any other component of tape drive system 10 or by any component of any system utilizing magnetic tape 12). By introducing oscillations that are 180° out of phase with the detected longitudinal oscillations, the longitudinal oscillations caused by magnetic tape 12 passing over tape head 18 are substantially canceled out.

There are several points throughout tape drive system 10 where such counteractive longitudinal oscillations can be introduced into magnetic tape 12. For instance, the rotational velocity of hub 14, either alone or in conjunction with hub 15, can be alternately increased and diminished to introduce a counteractive longitudinal oscillation into magnetic tape 12. The same is true for roller 16 or for any combination of two or more rollers 16 that may have its/their rotational dampening characteristic altered, such as by increasing or diminishing the rotational dampening to dampen an amplitude of the longitudinal oscillations. Alternatively, one of the rollers 16 may be moved back and forth longitudinally to introduce a counteractive longitudinal oscillation into magnetic tape 12. Also, two or more of the rollers 16 may be moved back and forth longitudinally to introduce the counteractive longitudinal oscillation into magnetic tape 12. Their longitudinal movement can be coordinated with one another, or independent of one another, as desired. Also, tape head 18 can be moved back and forth longitudinally to introduce the counteractive longitudinal oscillation into magnetic tape 12. In systems with more than one head 18, one, two or all tape heads 18 could move back and forth longitudinally to introduce the counteractive longitudinal oscillation into magnetic tape 12. As with rollers 16 the longitudinal movement of tape heads 18 can be coordinated with or independent of, the other tape heads.

Longitudinal motion of the roller(s) and/or head(s) could be excited through multiple means. Since the longitudinal tape vibrations typically are at very high frequencies and the amplitude of longitudinal tape vibrations are very small, piezo-electric actuation would be one of the possible solutions. Piezo-electric materials change shape in the presence of an electric field. This has been used to build piezo-electric motors that can operate at high frequencies (comparable to those found in tape longitudinal vibrations) and very small motions.

Any of the above techniques may be used in unison or sequentially to generate the counteractive longitudinal oscillation in magnetic tape 12. Further, once the counteractive longitudinal oscillation is generated in magnetic tape 12, the detection means discussed above can be engaged continuously to continue to monitor for the presence of a longitudinal oscillation in magnetic tape 12 and the techniques described above to generate the counteractive longitudinal oscillation can be continuously modified to revise either the frequency or the amplitude or both of the counteractive longitudinal oscillation.

Figure 7:
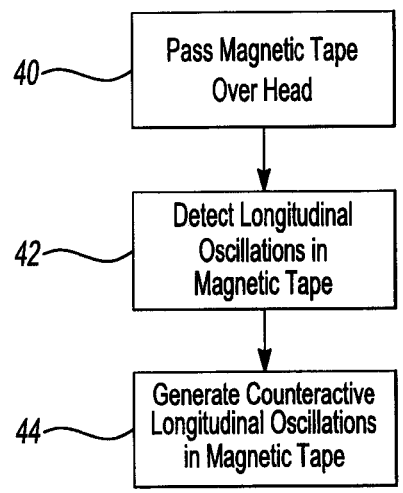
FIG. 7 is a block diagram illustrating a first example of the method of the present invention.

FIG. 7 is a block diagram illustrating an example of the method of the present invention. At step 40, magnetic tape 12 is passed over the head 18 of the tape drive system 10. At step 42, longitudinal oscillations in the magnetic tape 12 are detected. At step 44, tape drive system 10 generates counteractive longitudinal oscillations in the magnetic tape. In some examples, step 44 is accomplished by changing the rotational damping characteristic of hub 14. For instance, the rotational damping characteristic of hub 14 may be alternately increased and diminished in the sequence that generates the counteractive longitudinal oscillation. In other examples, step 44 is accomplished by changing a rotational damping characteristic of one of the rollers 16 of tape drive system 10. This can be accomplished by alternately increasing and diminishing the rotational damping characteristic of the roller 16 in a sequence that generates the counteractive longitudinal oscillation. In other examples, the rotational damping characteristic for more than one of rollers 16 is changed to generate the counteractive longitudinal oscillation.

In other examples, step 44 is accomplished by moving one of the rollers 16 longitudinally to generate the counteractive longitudinal oscillation. In some examples, this is accomplished by moving the one of the rollers back and forth longitudinally in a sequence that generates the counteractive longitudinal oscillations. In other examples, the counteractive longitudinal oscillation is generated by moving two of the rollers longitudinally.

In another example, step 44 is accomplished by moving the head longitudinally to generate the counteractive longitudinal oscillation. This may be accomplished by moving the head back and forth in a longitudinal direction in a sequence that generates the counteractive longitudinal oscillations. In tape drive systems having two or more heads, the counteractive longitudinal oscillations are generated by moving the two or more heads longitudinally.

Figure 8:
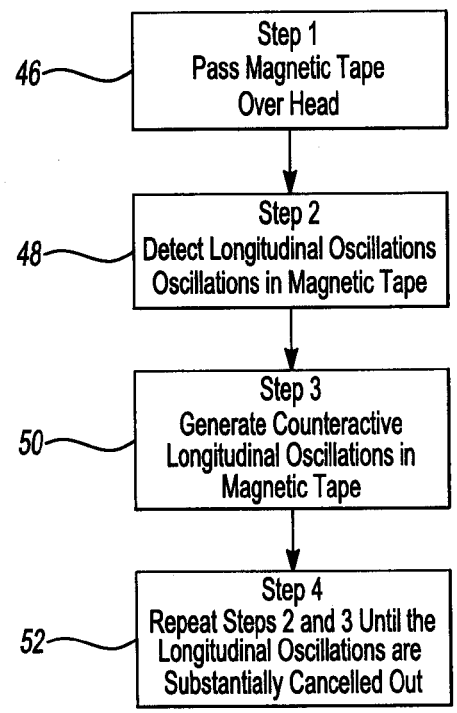
FIG. 8 is a block diagram illustrating a second example of the method of the present invention.

With respect to FIG. 8, another example for counteracting longitudinal oscillations in the magnetic tape as it passes over a head in the tape drive system is illustrated. At step 46, the magnetic tape is passed over the head. At step 48, the occurrence of longitudinal oscillations in the magnetic tape is detected. At step 50, a counteractive longitudinal oscillation is generated in the magnetic tape that is substantially 180 degrees out of phase with the longitudinal oscillations. At step 52, the second and third steps of this example are repeated until the longitudinal oscillations in the magnetic tape are substantially cancelled out.

Figure 9:
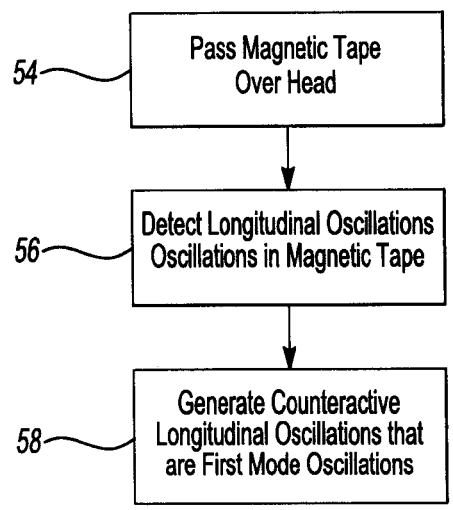
FIG. 9 is a block diagram illustrating a third example of the method of the present invention.

At FIG. 9, a third example of a method for counteracting longitudinal oscillations in a magnetic tape is illustrated. In this example, tape drive system 10 includes two rollers for guiding the magnetic tape through the tape drive system. The two rollers are disposed on opposite sides of the head and the longitudinal oscillations of the magnetic tape occur between the two rollers. In this example, at step 54, the magnetic tape is passed over the head. At step 56, the occurrence of longitudinal oscillations in the magnetic tape is detected. At step 58, counteractive longitudinal oscillations that are substantially 180 degrees out of phase with the longitudinal oscillations are generated in the magnetic tape. In this example, the counteractive longitudinal oscillations are first mode oscillations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of counteracting longitudinal oscillations in a magnetic tape as it passes over a head in a tape drive system, the method comprising the steps of:
   passing the magnetic tape over the head;
   detecting the occurrence of a longitudinal oscillation in the magnetic tape; and
   generating a counteractive longitudinal oscillation in the magnetic tape that counteracts the longitudinal oscillation;
   wherein the tape drive system includes a plurality of rollers for guiding the magnetic tape through the tape drive system, and wherein the counteractive longitudinal oscillation is at least partially generated by moving one of the rollers longitudinally.

2. The method of claim 1 wherein the detecting step comprises detecting the occurrence of multiple longitudinal oscillations in the magnetic tape, and the generating step comprises generating multiple counteractive longitudinal oscillations in the magnetic tape that are substantially 180 degrees out of phase with the longitudinal oscillations to counteract the longitudinal oscillations, and wherein the counteractive longitudinal oscillations are at least partially generated by moving the one roller longitudinally.

3. The method of claim 2 wherein the tape drive system includes a hub for pulling the magnetic tape through the tape drive system, and wherein the counteractive longitudinal oscillations are partially generated by changing a rotational velocity of the hub.

4. The method of claim 2 wherein the tape drive system further includes an additional hub for controlling rotation of the magnetic tape in a tape cartridge associated with the tape drive system, and wherein the rotational velocities of the hub and the additional hub are alternately increased and diminished in a sequence that generates a portion of the counteractive longitudinal oscillations.

5. The method of claim 2 wherein the plurality of rollers includes two rollers disposed on opposite sides of the head, and the longitudinal oscillations of the magnetic tape occur between the two rollers, and wherein the counteractive longitudinal oscillations are first mode oscillations.

6. The method of claim 2 wherein the one of the rollers is moved back and forth longitudinally in a sequence that at least partially generates the counteractive longitudinal oscillations.

7. The method of claim 2 wherein the counteractive longitudinal oscillations are at least partially generated by moving two of the rollers longitudinally.

8. The method of claim 2 wherein the counteractive longitudinal oscillations are partially generated by moving the head longitudinally.

9. The method of claim 8 wherein the head is moved back and forth longitudinally in a sequence that generates a portion of the counteractive longitudinal oscillations.

10. The method of claim 8 wherein the tape drive system comprises two of the heads, and wherein the counteractive longitudinal oscillations are partially generated by moving the two heads longitudinally.

11. A method of counteracting longitudinal oscillations in a magnetic tape as it passes over a head in a tape drive system, the method comprising the steps of:
    step 1. passing the magnetic tape over the head;
    step 2. detecting the occurrence of longitudinal oscillations in the magnetic tape;
    step 3. generating counteractive longitudinal oscillations in the magnetic tape that are substantially 180 degrees out of phase with the longitudinal oscillations; and
    step 4. repeating steps 2 and 3 until the longitudinal oscillations are substantially canceled out;
    wherein the counteractive longitudinal oscillations are at least partially generated by moving the head longitudinally.

12. The method of claim 11 wherein the tape drive system includes a first hub and a second hub for pulling the magnetic tape through the tape drive system, and wherein the counteractive longitudinal oscillations are partially generated by changing a rotational velocity of at least one of the first and the second hubs.

13. The method of claim 11 wherein the tape drive system includes a plurality of rollers for guiding the magnetic tape through the tape drive system, and wherein the counteractive longitudinal oscillations are partially generated by moving one of the rollers longitudinally.

14. The method of claim 13 wherein the one of the rollers is moved back and forth longitudinally in a sequence that partially generates the counteractive longitudinal oscillations.

15. The method of claim 11 wherein the head is moved back and forth longitudinally in a sequence that at least partially generates the counteractive longitudinal oscillations.

16. A method of counteracting longitudinal oscillations in a magnetic tape as it passes over a head in a tape drive system, the tape drive system including a hub for pulling the magnetic tape through the tape drive system, the method comprising the steps of:
    passing the magnetic tape over the head;
    detecting the occurrence of longitudinal oscillations in the magnetic tape; and
    changing a rotational damping characteristic of the hub to dampen the longitudinal oscillations wherein the rotational damping characteristic of the hub is alternately increased and diminished in a sequence that dampens the longitudinal oscillations.

17. The method of claim 16 wherein the tape drive system further includes a plurality of rollers for guiding the magnetic tape through the tape drive system, and wherein the method further comprises alternately increasing and diminishing a rotational damping characteristic of at least one of the rollers in a sequence that dampens the longitudinal oscillations.

18. The method of claim 17 wherein the rotational damping characteristic of all of the rollers is alternately increased and diminished in a sequence that dampens the longitudinal oscillations.

19. The method of claim 16 wherein the tape drive system further includes a plurality of rollers for guiding the magnetic tape through the tape drive system, and wherein the method further comprises changing a rotational damping characteristic of one of the rollers to reduce an amplitude of the longitudinal oscillations.

* * * * *

UNITED STATES PATENT AND TRADEMARK OFFICE
CERTIFICATE OF CORRECTION

Page 1 of 1

PATENT NO. : 8,089,726 B2
APPLICATION NO. : 12/054920
DATED : January 3, 2012
INVENTOR(S) : John P. Nibarger It is certified that error appears in the above-identified patent and that said Letters Patent is hereby corrected as shown below:

Column 9, Line 19, Claim 4:

After "The method of claim" delete "2"
and insert -- 3 --.

Signed and Sealed this
Twentieth Day of March, 2012

David J. Kappos
*Director of the United States Patent and Trademark Office*